(12) United States Patent
Jones et al.

(10) Patent No.: US 7,810,093 B2
(45) Date of Patent: Oct. 5, 2010

(54) PARALLEL-AWARE, DEDICATED JOB CO-SCHEDULING WITHIN/ACROSS SYMMETRIC MULTIPROCESSING NODES

(75) Inventors: Terry R. Jones, Livermore, CA (US); Pythagoras C. Watson, Livermore, CA (US); William Tuel, Kingston, NY (US); Larry Brenner, Austin, TX (US); Patrick Caffrey, Saugerties, NY (US); Jeffrey Fier, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1627 days.

(21) Appl. No.: 10/989,704

(22) Filed: Nov. 15, 2004

(65) Prior Publication Data

US 2005/0131865 A1    Jun. 16, 2005

Related U.S. Application Data

(60) Provisional application No. 60/520,159, filed on Nov. 14, 2003.

(51) Int. Cl.
*G06F 9/46* (2006.01)

(52) U.S. Cl. .................. 718/102; 718/100; 718/103; 718/107; 718/108

(58) Field of Classification Search .......... 718/102, 718/103, 107, 108
See application file for complete search history.

(56) References Cited

U.S. PATENT DOCUMENTS

| | | | | |
|---|---|---|---|---|
| 5,325,526 | A  * | 6/1994 | Cameron et al. | 718/102 |
| 5,600,822 | A    | 2/1997 | Grice et al. | |
| 6,021,457 | A  * | 2/2000 | Archer et al. | 710/260 |
| 6,092,098 | A  * | 7/2000 | Araki et al. | 709/201 |
| 6,199,093 | B1 * | 3/2001 | Yokoya | 718/102 |
| 6,345,287 | B1 * | 2/2002 | Fong et al. | 718/102 |
| 6,526,163 | B1 * | 2/2003 | Halmann et al. | 382/128 |
| 7,424,712 | B1 * | 9/2008 | Sistare et al. | 718/102 |

OTHER PUBLICATIONS

Tipparaju et al., "Fast Collective Operations Using Shared and Remote Memory Access Protocols on Clusters", IEEE, Proceedings of the International Parallel and Distributed Processing Symposium, Apr. 22-26, 2003, pp. 1-10.*

(Continued)

*Primary Examiner*—Meng-Ai An
*Assistant Examiner*—Kenneth Tang
(74) *Attorney, Agent, or Firm*—James S. Tak

(57) ABSTRACT

In a parallel computing environment comprising a network of SMP nodes each having at least one processor, a parallel-aware co-scheduling method and system for improving the performance and scalability of a dedicated parallel job having synchronizing collective operations. The method and system uses a global co-scheduler and an operating system kernel dispatcher adapted to coordinate interfering system and daemon activities on a node and across nodes to promote intra-node and inter-node overlap of said interfering system and daemon activities as well as intra-node and inter-node overlap of said synchronizing collective operations. In this manner, the impact of random short-lived interruptions, such as timer-decrement processing and periodic daemon activity, on synchronizing collective operations is minimized on large processor-count SPMD bulk-synchronous programming styles.

13 Claims, 9 Drawing Sheets

OTHER PUBLICATIONS

Bryant, et al., "Operating System Support for Parallel Programming on RP3", IBM J. Des. 35 (5/6) pp. 617-634 (Nov. 1991).

Dusseau, et al., "effective Distributed Scheduling on Parallel Workloads", ACM Sigmetrics '96 Conference on the Measurement and Modeling of Computer Systems (1996).

Ousterhout, "Scheduling Techniques for Concurrent Systems", Third International Conference on Distributed Computing Systems, pp. 22-30 (May 1982).

Sobalvarro, et al., Dynamic Co-scheduling on Workstation Clusters, Digital Systems Research Center Technical Note (Mar. 1997).

* cited by examiner

PARALLEL-AWARE, DEDICATED JOB CO-SCHEDULING WITHIN/ACROSS SYMMETRIC MULTIPROCESSING NODES

I. CLAIM OF PRIORITY IN PROVISIONAL APPLICATION

This application claims priority in provisional application filed on Nov. 14, 2003, entitled "Parallel Aware Scaling" Ser. No. 60/520,159, by inventors Terry R. Jones et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to job scheduling in a parallel environment, and more particularly to dedicated job co-scheduling of a parallel application which coordinates system interferences and task priorities between nodes and within a node, to increase overlapping periods of synchronizing collective operations and thereby increase performance and scalability.

III. BACKGROUND OF THE INVENTION

In a parallel computing environment (such as for example the IBM Parallel Environment (PE) running on the operating system sold under the trademark AIX® by IBM Corporation), "synchronizing collective operations" are operations in which a set of processes (typically every process) participates and no single process can continue until every process has participated. Illustrative examples of synchronizing collective operations from the MPI interface of the PE include MPI_Barrier, MPI_Allreduce, and MPI_Allgather. While required for a large class of parallel algorithms and therefore quite common, synchronizing collective operations can pose serious challenges to the performance and scalability of a parallel job/application. In particular, such synchronous collectives are vulnerable to interference from random occurrences of routine system and/or daemon activity (e.g. timer decrement interrupt processing, daemons associated with file system activity, daemons associated with membership services, monitoring daemons, cron jobs, etc.), since a single instance of a laggard process will impede or block the progress of every other process. This can result in a cascading effect, causing serialization and degrading performance and scalability of the parallel application.

The cascading effect is especially detrimental in the high performance computing (HPC) context of large-scale parallel environments, such as those of interest at national laboratories and supercomputing centers (hereinafter "HPC centers"), due to the large number of processors (CPUs) involved and the percentage time of each used by system and daemon activity. Experiments conducted by Applicants at the Lawrence Livermore National Laboratory (LLNL) have shown that typical operating system and daemon activity consumes about 0.2% to 1.1% of each CPU for large dedicated systems, such as for example the system sold under the trademark RS/6000® by IBM Corporation having 16 processors per node. As such, even minimal occurrences of random interfering system operations/activities/events can have a compounded effect when taken across all processors and detrimentally impact synchronizing collective operations of a parallel job/application, especially during synchronization or fine-grain parallelism. It is notable that these large-scale parallel environments typically perform a single parallel job consisting of thousands of cooperating processes occupying multiple machines/nodes dedicated to the parallel job (i.e. dedicated job co-scheduling). Since the machines are usually symmetric multiprocessing (SMP) nodes (i.e. each having two or more similar processors connected via a high-bandwidth link and managed by one operating system where each processor has equal access to I/O devices), a node is assigned as many processes as there are processors on the node and with each process acting as if it has exclusive use of the processor. In this environment, fair share CPU scheduling and demand-based co-scheduling required for networks of workstations (NOWs) are not necessary or applicable. Typical time-quanta involved in this "dedicated job co-scheduling" context is on the scale of operating system timer-decrement and/or communication interrupts.

As illustrated in FIG. 1, the impact of random interfering events on synchronizing collectives is determined in large measure by the degree/extent of overlap of the random events (as well as the synchronizing collectives) between processors. In particular, FIG. 1 shows two separate runs, indicated at reference characters 10 and 11, of the same eight-way parallel application on two nodes: Node 1 indicated at reference character 12, and Node 2 indicated at reference character 13, having four processors each. In the first run 10, system activity indicated by the pattern 15 occurs at purely random times in each of the eight processors. Periods utilized by the parallel application are represented by pattern 14. As a result, operations that require every processor can make progress only when the pattern 14 is present across all eight processors. The pattern indicated by reference character 16 represents those overlapping periods in time when the application is running across all eight processors. In the second run 11, the same amount of system activity occurs (i.e. there is the same total amount of the pattern 15) as in the first run 10. In the second run 11, however, these periods of system activity 15 are largely overlapped between processors. In this manner, much more time is available for parallel application activities that require all processors, as shown by the longer spans of the pattern 16. For clusters comprised of SMP nodes, both inter-node and intra-node overlap is an issue, and it is desirable to ensure overlap between nodes as well as on-node. For example, while the second run 11 shows very good on-node overlap of operating system interference, there is little cross-node overlap of operating system interference.

And parallel applications are most susceptible to operating system interference during synchronization or fine-grain parallel operations such as ring communication patterns, barriers, reductions, etc. For example, FIG. 2 shows a bulk-Synchronous SPMD model of parallel application, with each cycle containing one or more such fine-grain operations. Each process of a parallel job executes on a separate processor and alternates between computation 17 and communication 19 phases. The importance of these collective synchronizing operations is dependent on the duration of computation and communication periods. Barrier or reduction phases are indicated by pattern 18, and waiting periods are indicated by pattern 20. Typical cycles can last between from a few milliseconds up to several seconds.

The ability of a large processor count cluster to perform parallel applications with synchronizing collectives will therefore depend heavily upon the degree of interference introduced by the operating system. Taking for example MPI_Allreduce (hereinafter "Allreduce") from the MPI interface for the AIX® system, experimental measurements taken from jobs run on "ASCI White" and "ASCI Q" systems at LLNL and Los Alamos National Laboratory (LANL) indicate Allreduce consume more than 50% of total time at 1728 processors. A second study conducted by different researchers on ASCI Q measured Allreduce to consume around 50% of total time at 1728 processors, and over 70% of total time at 4096 processors. Interference to these operations would therefore have a significant impact on the overall application. Moreover, the performance of Allreduce also illustrates the poor scaling of synchronizing collective operations due to interfering operations, as discussed in the "Performance Results" section of the Detailed Description of experiments conducted by the Applicants. Developers and users of parallel applications have learned to deal with poor Allreduce performance by leaving one CPU idle on a multi-CPU (MP) node. This approach leaves a reserve CPU for processing daemons which would otherwise interfere with fine-grain activities. However the approach is undesirable since such strategies enforce a ceiling on machine efficiency. In addition, the approach does not handle the occasional event of two concurrent interfering daemons. And it also artificially limits the maximum scalability of the machine as one CPU is forfeited for every node on the machine.

It is notable that problematic interference such as timer decrement interrupt processing and daemon activities are inherent in UNIX® derivatives, and are not specific to AIX®, which results in large variability and reduced synchronous collective performance in large Unix-based systems. This is because operating systems based on UNIX® and its variants (including AIX® and Linux®) were originally developed without consideration of the types of issues arising in parallel applications spanning multiple computers and operating system instances, instead viewing them as thousands of independent processes.

For example, while the AIX® operating system is able to run work simultaneously on multiple processors, it is not designed to start work simultaneously on multiple processors. There is no issue when processors are idle: if two threads are readied almost simultaneously, two idle processors will begin running them essentially immediately. AIX® handles the busy processor case differently. When work is made ready in the face of busy processors, it must wait for the processor to which it is queued. Should another processor become idle, it may beneficially "steal" the thread, but this is atypical when running large parallel applications. If the newly ready thread has a better execution priority than the currently running thread on its assigned processor, the newly ready thread preempts the running thread. If the processor involved is the one on which the readying operation occurred, the pre-emption can be immediate. If not, the other, busy, processor must notice that a pre-emption has been requested. This happens whenever its running thread (1) enables for interrupts in the kernel, as during a system call; (2) takes an interrupt, as when an I/O completes or a timer goes off; or (3) blocks, as when waiting for I/O completion such as for a page fault. The problem is that this can represent a significant delay, which can be up to 10 msec until the next routinely scheduled timer interrupt gives the busy processor's kernel the opportunity to notice and accomplish the pre-emption. The AIX® kernel is known to already contain a capability called the "real time scheduling" option, which solves a part of this problem. When this option is invoked, the processor causing a pre-emption will force a hardware interrupt to be generated for the processor on which the pre-emption should occur. While this is not immediate, the pre-emption can typically be accomplished in tenths of a millisecond, as opposed to several milliseconds without this option. The existing "real time scheduling" option, however, only forces an interrupt when a better priority thread becomes runnable. It does not force an interrupt for a "reverse pre-emption," which occurs when the priority of a running thread is lowered below that of a runnable, waiting thread. Additionally, the real time scheduling option forces an interrupt to only one processor at a time. Once such an interrupt is "in flight," it does not generate further interrupts if the processor involved would be eligible to run the thread on whose behalf the previous interrupt had been generated.

There is therefore a need to improve the scalability of large processor count parallel applications by improving kernel scheduling, and in particular providing collaborative dedicated job co-scheduling of the processes both within a node and across nodes using scheduling policies that include a global perspective of the application's process working set without. Since collective operations such as "barriers" and "reductions" are known to be extremely sensitive to even usually harmless events such as context switches among members of a working set, such co-scheduling techniques would greatly diminish the impact to fine grain synchronization even when interference present in full-featured operating systems such as daemons and interrupts cannot be removed. Such fine grain synchronizing activities can proceed without having to experience the overhead of making scheduling requests, and thereby mitigate the effects of system software interference without the drawbacks of underutilized MP nodes.

IV. SUMMARY OF THE INVENTION

One aspect of the present invention includes, in a parallel computing environment comprising a network of SMP nodes each having at least one processor, a parallel-aware co-scheduling method for improving the performance and scalability of a dedicated parallel job having synchronizing collective operations, comprising: coordinating interfering system and daemon activities on a node and across nodes to promote intra-node and inter-node overlap of said interfering system and daemon activities as well as intra-node and inter-node overlap of said synchronizing collective operations.

Another aspect of the present invention includes a computer program product comprising: a computer usable medium and computer readable code embodied thereon for improving the performance and scalability of a parallel application in a parallel computing environment comprising a network of SMP nodes each having at least one processor, said parallel application having synchronizing collective operations, the computer readable code comprising: a computer readable program code means configured to cause coordination of interfering system and daemon activities on a node and across nodes to promote intra-node and inter-node overlap of said interfering system and daemon activities as well as intra-node and inter-node overlap of said synchronizing collective operations.

And another aspect of the present invention includes, in a parallel computing environment comprising a network of SMP nodes each having at least one processor, a dedicated job co-scheduling system for improving the scalability of parallel application having synchronous collective operations, comprising: a kernel scheduling dispatcher module, and an external time-based, dedicated job co-scheduler module, both adapted to globally coordinate the scheduling of system interference and priorities on a node and between nodes, so as to improve the performance and scalability of the parallel application.

BRIEF DESCRIPTION OF THE DRAWINGS

The accompanying drawings, which are incorporated into and form a part of the disclosure, are as follows.

DETAILED DESCRIPTION

The present invention is generally directed to a system and method which improves the scalability of dedicated parallel jobs by adding parallel awareness to the operating system and computing environment. In particular, the present invention improves kernel scheduling with an external time-based co-scheduler prototype to enable coordinated scheduling of system interferences and daemon activity on a node and across nodes. In the following discussion, the AIX operating system is used as the base operating system and kernel upon which the present invention may be implemented. This may be accomplished in AIX by the inclusion of additional modules and code, or by modifications of the existing AIX kernel to achieve the functionalities and performance levels as described herein, but is not intended to be limited to AIX or any other operating system.

Figure 1:
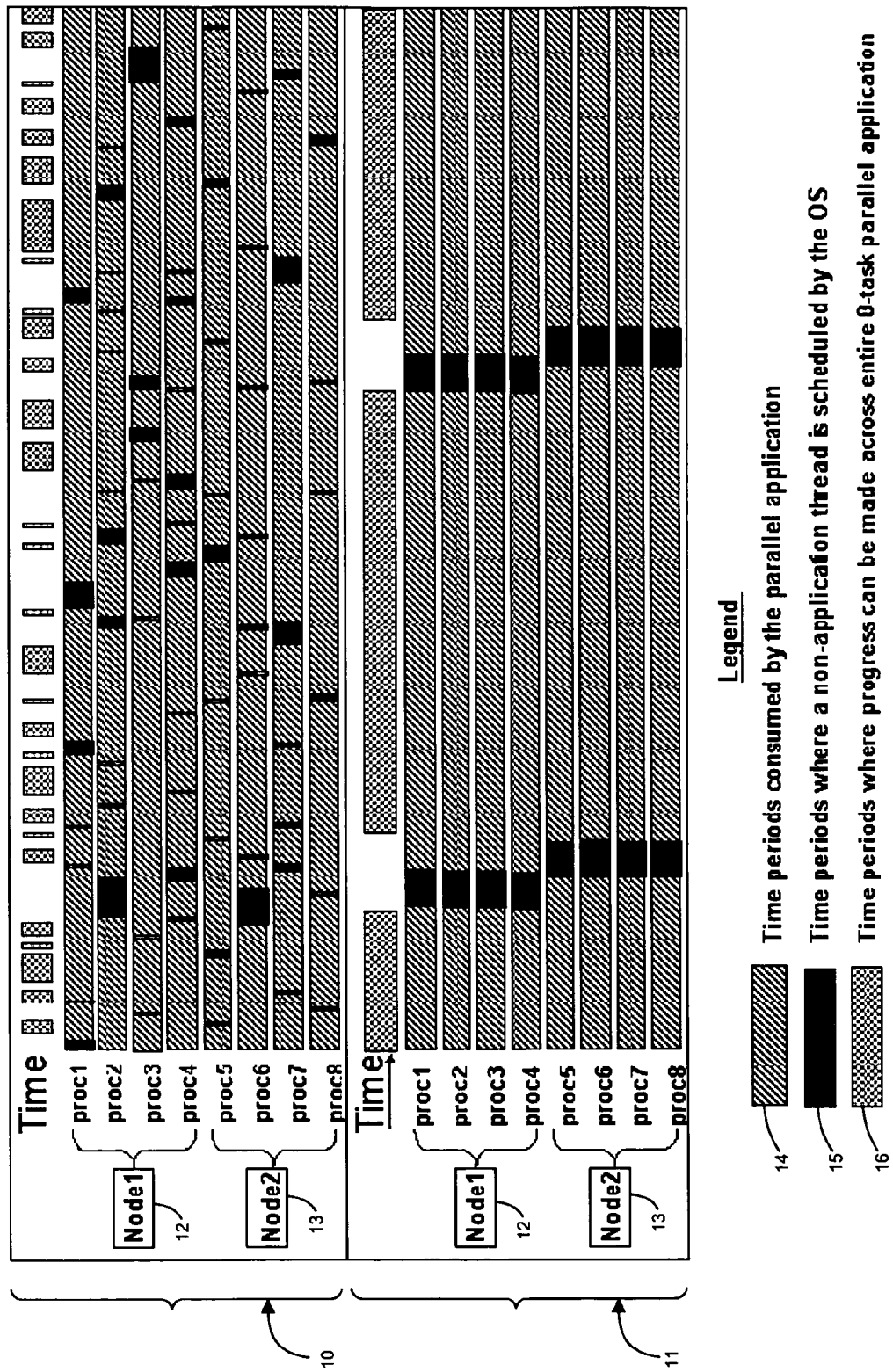
FIG. 1 is a graph showing two scheduling runs of a hypothetical 8-way parallel application on a multi-node/processor computing environment, illustrating the effects of uncoordinated job scheduling.
Figure 2:
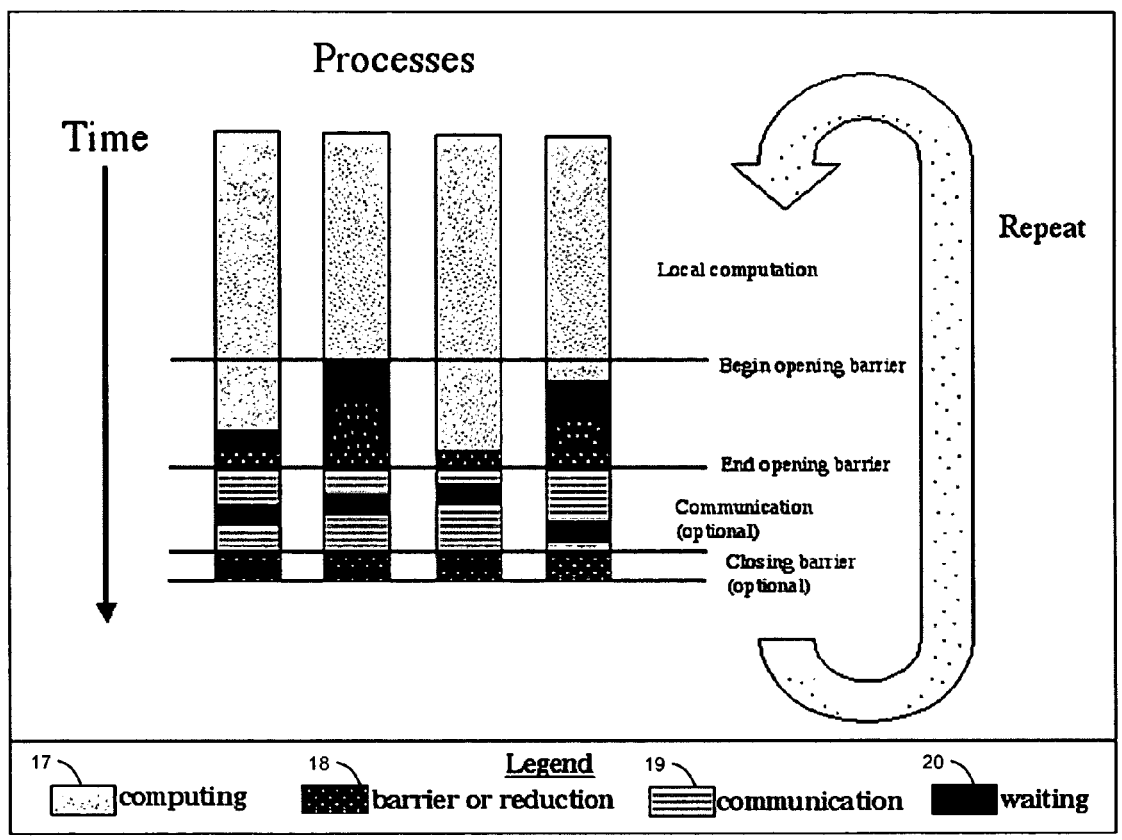
FIG. 2 is a graph showing an exemplary bulk-synchronous SPMD model of parallel application illustrating fine grain synchronization.
Figure 3:
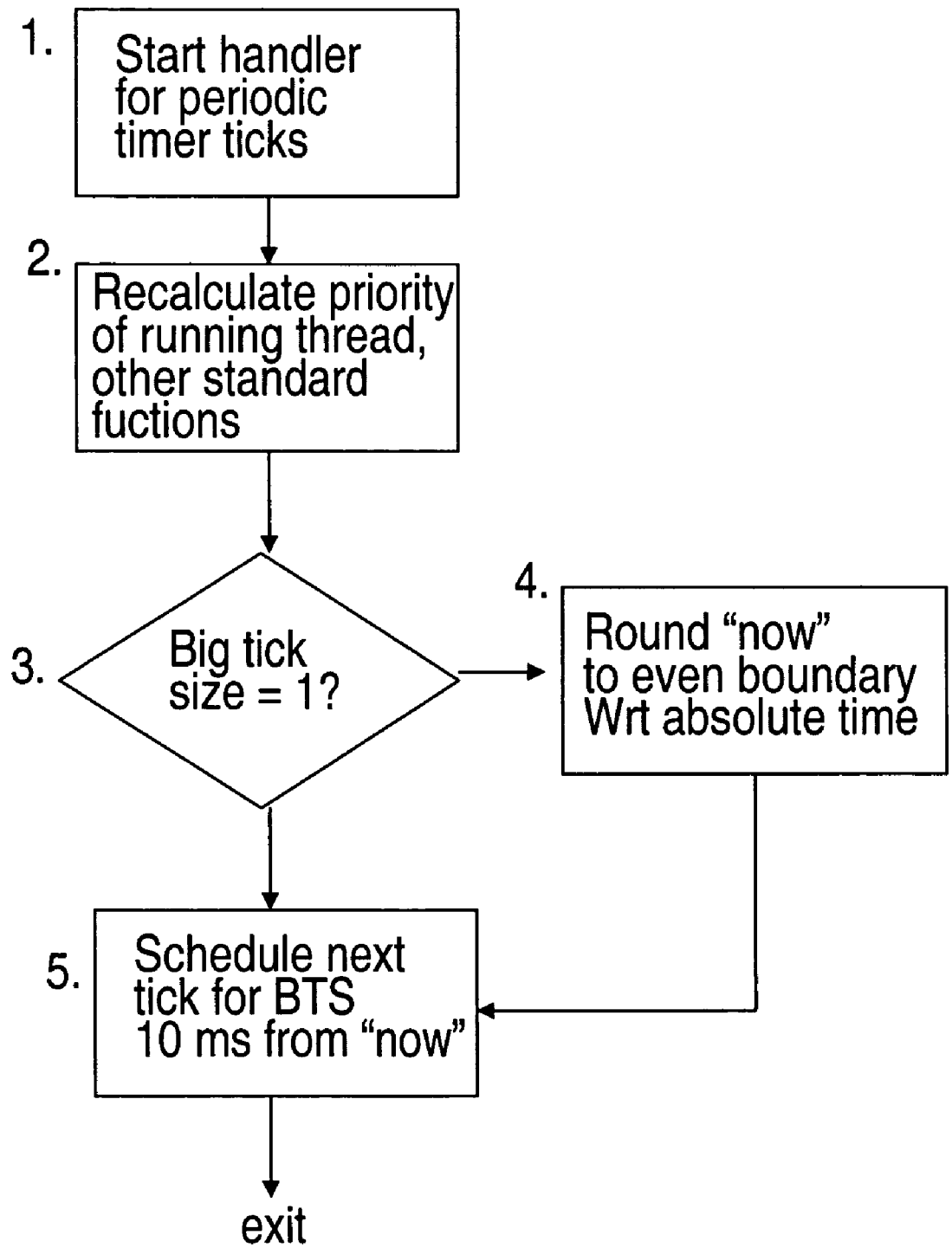
FIG. 3 is a flow diagram of an exemplary handling operration for periodic timer ticks of the present inveniton.
Figure 4:
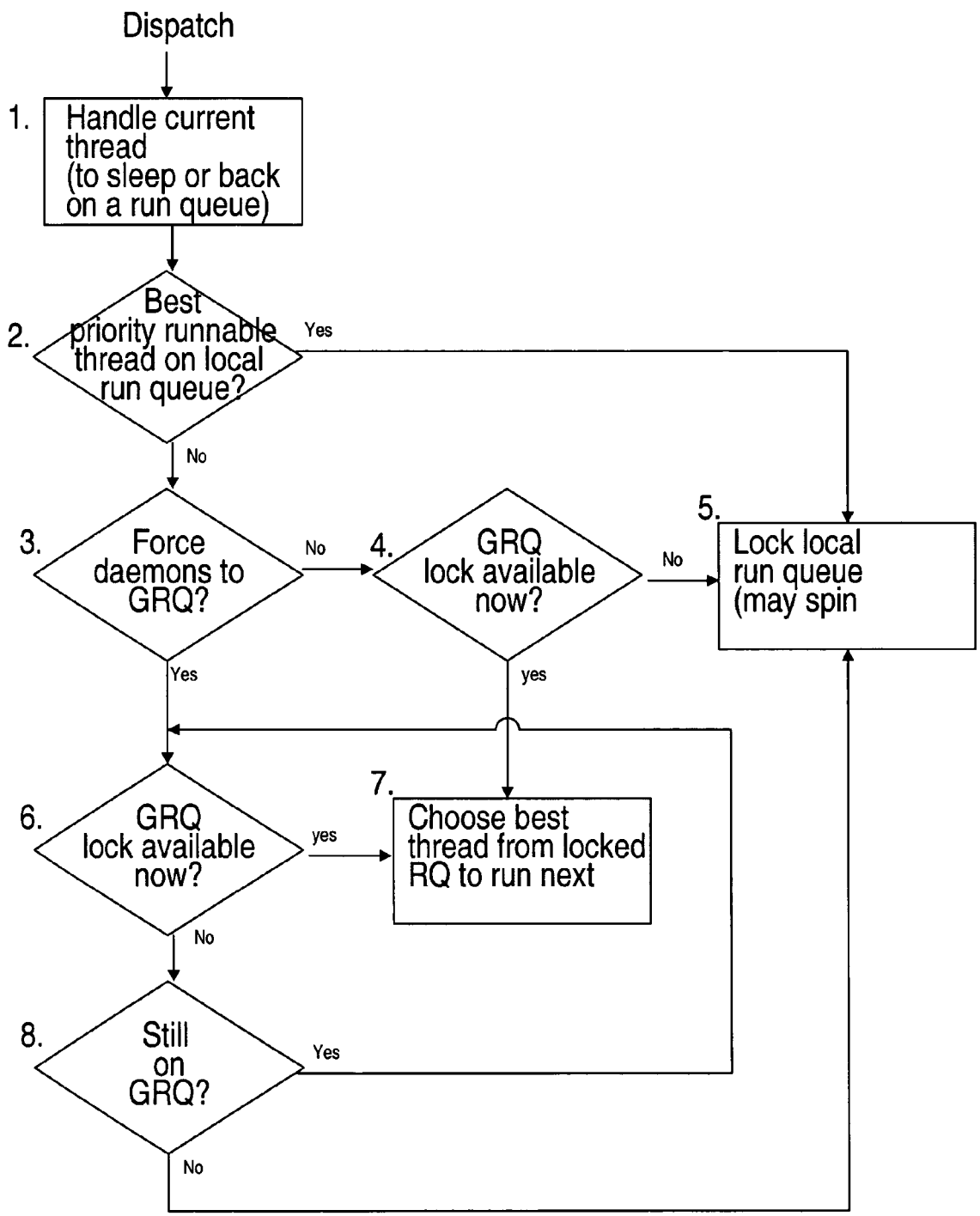
FIG. 4 is a flow diagram of an exemplary dispatching and prioritization of threads of the present invention.
Figure 5:
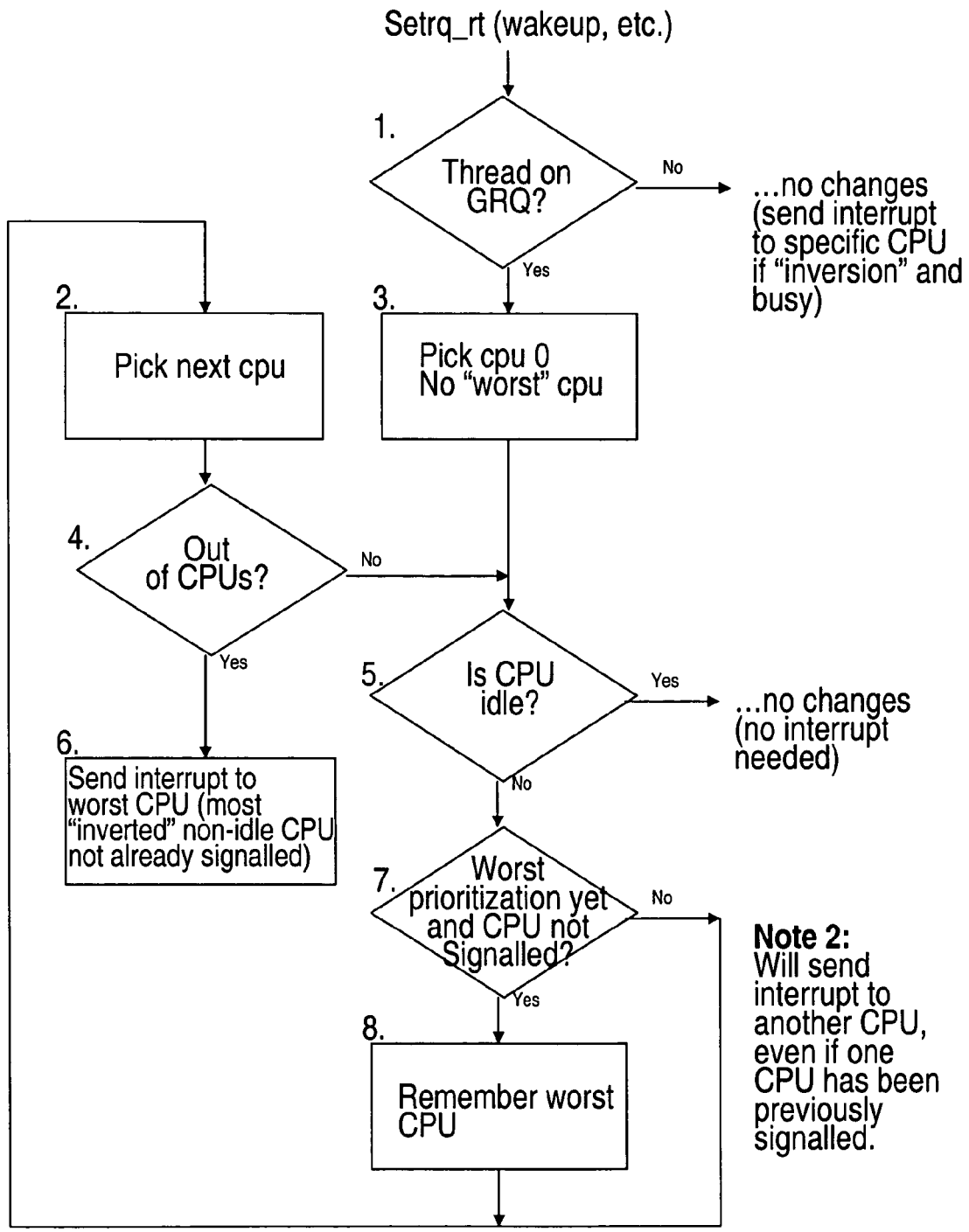
FIG. 5 is a flow diagram of an exemplary CPU selection and scheduling process of the present invention.

Given that uncoordinated system overhead causes scalability problems, the present invention operates to reduces that overhead, i.e. system overhead cycles. A first preferred method is to generate fewer routine time interrupts (e.g. decrementer interrupts). The periodic (e.g. 100 times a second on every CPU) generation of timer interrupts is an ongoing source of system overhead, albeit a relatively small one. This can be accomplished, for example, by modifying the AIX kernel by adding a "big tick" capability, so named because the periodic interrupts are generally known as tick interrupts in the UNIX world. In particular, every place (e.g. counter) in the kernel that was involved with tick processing was identified, and a "big tick" constant was added, instead of adding 1 to various counters. This big tick constant value can be chosen large enough to reduce the generation of interrupts, e.g. in the case of interrupts occurring 100 times a second (provided by default kernel), by selecting 25 instead of 1, would generate an interrupt only once where the default kernel would have generated 25. In this example, by taking just four of these interrupts a second instead of 100, substantial overhead is saved. Variability of the tick size is shown in FIG. 3, which also shows the operation of a system-wide alignment of ticks. Taking less frequent ticks yields a secondary benefit as well. Since the major consumers of system overhead are timer triggered, this mechanism causes a larger number of overhead tasks (daemons) to be made ready simultaneously. This natural batching saves overhead but, more importantly, increases the likelihood of multiple processors executing these overhead tasks simultaneously, reducing the net impact of this overhead on a parallel job.

Additionally, system overhead is reduced by executing overhead tasks with maximum parallelism. In the AIX kernel, work may be queued either to a single processor (to maximize storage locality), or to all processors (to minimize dispatching latency). Normal operation is to queue work to specific processors for best overall throughput. This behavior can be overridden, allowing only the parallel job's threads to be queued to specific processors. Everything else (namely, the system daemons) can be forced to be queued to all processors. While this may add significant overhead to the daemons as they execute, it also maximizes the parallelism with which they execute. The goal here is to minimize the total time that daemons were running, which, as a source of interference to a parallel job, is much more desirable than ensuring that each daemon runs with maximum efficiency. For example, if two daemons inherently take 3 msec each to run, it is preferred to run them simultaneously on two CPUs without regard for storage locality, and take perhaps 3.1 msec total time, than run them serially on a single CPU, and take 6 msec. The degradation to the daemons is insignificant compared to the benefit to the parallel job.

Another aspect of the invention for reducing system overhead is to run the various system daemons less frequently, by batch processing. As mentioned above, triggering the daemons less frequently as a side effect of "big ticks" is desirable. However, a preferred approach to reducing daemon overhead would be by providing a global-based co-scheduler that aggressively and substantially simultaneously sets the relative priorities of the daemons and the parallel job, with the intent of denying the daemons processor time for much longer than just the big tick interval. By allowing daemon work to "pile up" for seconds at a time, and only then allowing it access to processors, daemon activity can be forced to be executed simultaneously. In this fashion, the impact of the collective overhead generated by these daemons on the parallel job is minimized. For this priority-swapping scheme to work best, it is necessary to be able to pre-empt simultaneously across CPUs, as described above.

In addition to reducing system overhead, improving scability is provided by coordinating system interference. Much can be gained by coordinating system interference as well as minimizing it. A first method for coordination is to take timer "tick" interrupts "simultaneously" on each CPU. By deliberate design, the AIX kernel schedules its timer ticks in a "staggered" manner across the processors of an MP system. For example, on a 10-way MP, these interrupts are scheduled (in absolute msec) at times x, x+10, x+20, etc. on CPU 0. On CPU1, they are scheduled at times x+1, x+11, x+21, etc., and so on. The underlying idea is to keep the timer and timer-driven code from running simultaneously on multiple processors, since they are likely to contend for the same resources, and the same locks. With AIX 5.1, for example, the timer code was changed to require only a shared (or read) lock for much of its operation. This allowed the tick interrupts to be made essentially simultaneous across the processors of an MP system. As was the case with the daemons, this trades a little absolute efficiency in the timer interrupt handlers for a lot of parallelism between them, reducing the overall impact of timer tick handling on a parallel job. Incidentally, implementing these changes as options in a production operating system such as AIX requires some mechanism for selecting these options. This is accomplished in AIX by adding options to the schedtune command, which provides a consistent mechanism for invoking kernel options.

In addition to adding parallel awareness to intra-node scheduling, the present invention adds parallel awareness to inter-node scheduling. There are several elements to the dedicated job co-scheduler of the present invention: (1) obtaining a globally synchronized time; (2) determining which processes on a node are to be scheduled; (3) providing a schedule that provides good application performance but does not starve system tasks; (4) providing an administrative interface that controls which jobs are eligible for co-scheduling; (5) providing an "escape" mechanism that allows a task to request that system tasks be allowed to run—particularly distributed I/O services. The present invention provides a co-scheduler that runs on each node and ensures that the parallel tasks are scheduled at the same time. Everything that was beneficially done to coordinate system interference within an MP system (on node) can also be done across a clustered system. In particular: (1) By synchronizing the time of day across all CPUs of the cluster, tick interrupts can be scheduled at the same time cluster wide. This requires that tick interrupts not only occur with a given interval, but that these interrupts be scheduled at tick boundaries in real time. Thus, for example, a 10 msec tick must be forced to occur at a time an exact multiple of 10 msec from a global reference time. (2) Similarly, the priority-based coordination of daemons can be extended such that they are run at the same times not just on the processors of an MP node, but on all processors of a clustered system.

Figure 6:
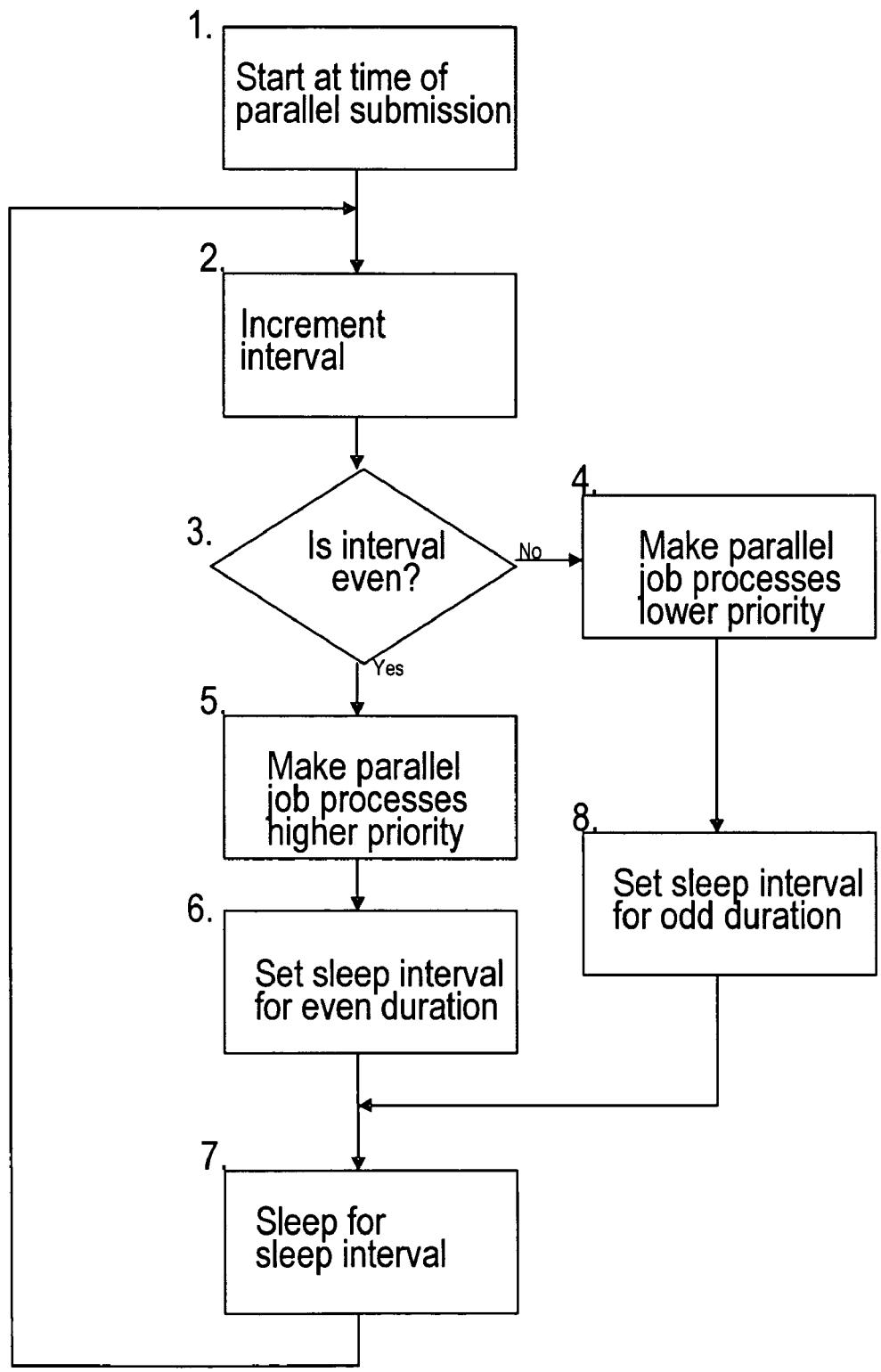
FIG. 6 is a flow diagram of an exemplary co-scheduling operation of the present invention.

The dedicated job co-scheduler of the present invention operates as follows, and is generally illustrated in FIG. 6. When a parallel job starts under, for example, the Parallel Operating Environment (POE) component of IBM PE, and requests that it be controlled by the co-scheduler, a daemon process is started on each node for the exclusive purpose of scheduling the dispatching priorities of the tasks of the job running on that node. It does this by cycling the process priority of the tasks between a favored and unfavored value at periodic intervals. The actual priorities, favored priority duty cycle, and adjustment period are obtained from an administrative file, /etc/poe.priority, on each node. Setting a process priority to a fixed favored priority value causes AIX to assign a processor to this process (assuming that there aren't higher priority processes already running), and hence to put the application task into a running state. Similarly, setting a process priority to a fixed unfavored priority causes AIX™ to assign some other process to the processor, if there are processes with more favored priority waiting to be run. Naturally, the co-scheduler itself runs with an even more favored priority, but sleeps most of the time.

On the IBM SP (Scalable POWERparallel) system, for example, with its switch interconnect, the switch provides a globally synchronized time that is available by reading a register on the switch adapter. The communication subsystem component of PSSP (Parallel System Support Programs), the SP System software, provides a function that allows an ordinary user program to access the time register, and thus allows programs running on the entire SP to have a common synchronized time base. On startup, the daemon compares the low order portion of the switch clock register with the low order bits of the AIX™ time of day value, and changes the AIX™ time of day so that the low order bits of AIX™ and the switch clock match. Thus, after startup has been completed on each node, the low order portions of the AIX™ clock are synchronized with the switch clock and with each other. It is not necessary to match the high order portions, as long as the AIX™ dispatching changes described above are affected only by the low order portion of the clock. Naturally, NTP must be turned off, since it is also trying to adjust the AIX™ clock. Furthermore, the co-scheduler adjusts its operation cycle so that the period ends on a second boundary (i.e. the co-scheduler period ends at 10:01:00, 10:01:01, 10:01:02, etc., and not at 10:00:00.27, 10:01:01.27, etc.) This way, all of the co-scheduler favored priority adjustments are made at a synchronized time across all nodes, with no inter-node communication required between the co-scheduler daemons.

At startup, the co-scheduler knows the user ID and the schedule to be used, but doesn't know the process ID's of the parallel application, which could be started by a script called by the process that forked the co-scheduler. Identifying the processes to be scheduled is done by the MPI library component of Parallel Environment. The library provides a "control pipe" between the library and the Partition Manager Daemon (pmd) that is the common ultimate parent of all tasks for a specific job on that node. The control pipe is used to send initialization/termination messages to POE. In addition, when a task calls the MPI initialization routine, its process ID is sent as a message to the pmd, which forwards it to the co-scheduler via a pipe that remains open for the duration of the job. The co-scheduler reads any data from its pipe, and from that builds a list of processes on which to adjust scheduling priority. Normally, as soon as a process registers, it is actively co-scheduled. When the parallel job ends, the co-scheduler knows that the processes have gone away, and exits.

The Parallel Environment co-scheduler implements a schedule that consists of alternate intervals of favored and non-favored priority. The administration file specifies the favored and non-favored priority values, the overall scheduling period in seconds, and the percent of time that the application is to be dispatched with the favored priority value. The administrator is given wide latitude in choosing the values—it is possible to give the tasks priority over all other processes running on the node for a very long time. This can starve system daemons and make the node unusable—in our experiments we encountered situations in which the only way to recover control was to reboot the node. Experiments have shown that a period of about 10 seconds, with a duty cycle of 90 or 95% works sufficiently well on the 16-processor SMP nodes used in the SP. As for the favored priority value, normal priority is 60, and "real-time" processes usually run with priorities between, for example, 40 and 60. A favored value of less than 40 will defer most system daemon activity to the end of the period. Some daemons may time out in that time, and may have to have parameter adjustments to extend their timeout tolerance. Alternatively, for example, with GPFS (General Parallel File System, i.e. the high-performance shared-disk clustered file system developed by IBM), one could set the priority of the GPFS (mmfsd) daemon to 40 and the favored task priority to 41, thus allowing GPFS to run whenever it needed to, but making the application more favored than anything else. It is important to profile the background workload to determine how much system resource is being used when the application is not running.

And administrative interface is a file (e.g./etc/poe.priority) provided that is root-only writable, and is assumed to be the same on each node. Each record in the file identifies a priority class name, user ID, and scheduling parameters as mentioned above. A user wishing to have a job controlled by the co-scheduler sets the POE environment variable with a priority class name (e.g. MP_PRIORITY=<priority class name>). At job start, the administrative file is searched for a match of priority class and user ID. If there is a match, the co-scheduler is started. Otherwise, an attention message is printed and the job runs as if no priority had been requested. There has been some dissatisfaction with this particular way of specification, and alternatives (perhaps using group ID instead of user ID) are being considered.

Many applications have I/O phases, particularly at job start, but also at job checkpoints and termination, during which the application depends on system daemon activity (GPFS, syncd, NFS daemons, etc.) to complete the I/O. During these periods, it is desirable for the application to have normal dispatching priority, not favored, as there is nothing the application can do while waiting for the I/O daemons to complete. Since the co-scheduler is unaware of the details of the application, the prototype MPI library provides an API that allows the application to request that it be detached from the co-scheduler, and another that allows the application to request that it be attached to the co-scheduler. These API calls are implemented via messages to the co-scheduler passing through the control pipe to the pmd, and then on the pipe from the pmd to the co-scheduler, which acts on the request when it sees it. Since there is no communication between the co-schedulers, if the application wants these calls to be synchronized, it will need to provide its own barrier calls as well.

Performance Results

Test runs were undertaken to determine the performance and effectiveness of the kernel modifications and co-scheduler in addressing performance variability and scaling problems encountered with the standard AIX™ kernel. The tools employed were a small benchmark code (i.e. aggregate_trace.c), a production application (i.e. ALE3D, a large 3-D multi-physics code), and the AIX™ trace utility.

Anomalously poor scaling behavior of MPI_Allreduce was recorded when running more than 1024 task jobs. The standard tree algorithm for MPI_Allreduce does no more than $2*\log_2(N)$ separate point to point communications to complete the reduction where N is the number of tasks in the MPI communicator. For perfect scalability, the time to complete a call to MPI_Allreduce should increase in proportion to the log of the number of tasks participating in the call. For a relatively small number of tasks, the scaling exhibited nearly the expected logarithmic behavior. Starting with about 512 tasks, however, the call time began to deviate from the expected logarithmic behavior and soon became nearly linear with the number of tasks. In order to isolate the scaling problem a synthetic benchmark, aggregate_trace.c, was created. This program was intended to simulate the sorts of tasks programs may perform in the section of code where they use MPI_Allreduce. In this particular code, three loops are done where the timings of 4096 MPI_Allreduce calls were measured.

Figure 7:
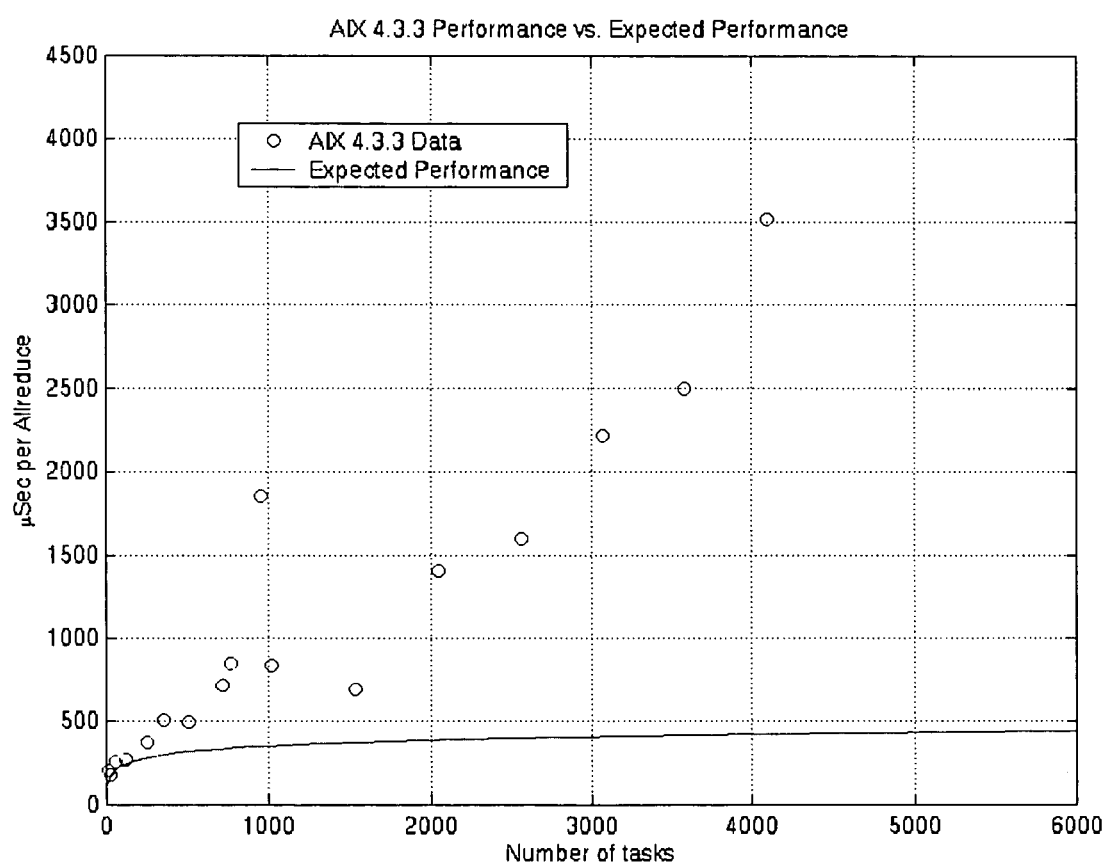
FIG. 7 is a graph plotting Allreduce usec vs. Processor count for runs using 16 tasks per noe and a standard AIX kernel, exhibiting variability and linear performance scales.
Figure 8:
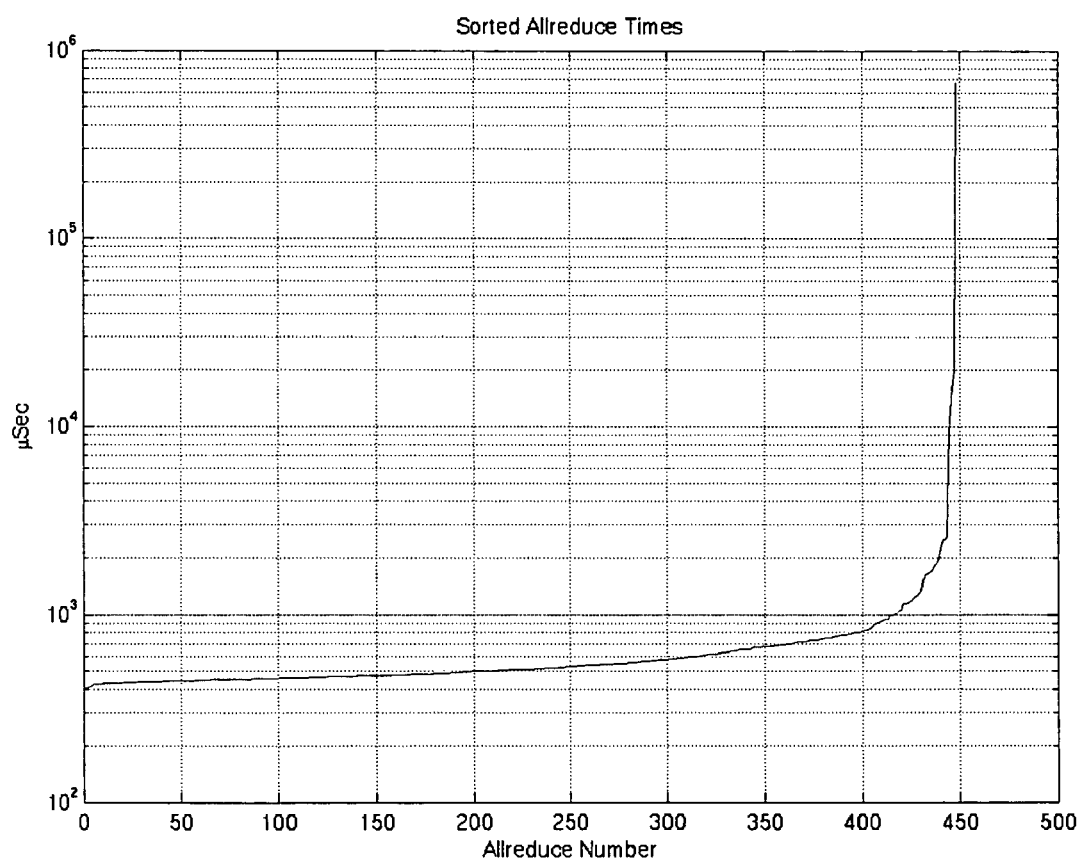
FIG. 8 is a graph lotting sorted Allreduce times, and illustrating the poor average time due to the handful of outliers.

As a baseline, extensive runs were made with aggregate_trace and the standard AIX kernel using 15 tasks per node. Runs using 16 tasks per node were also made for comparison, and they are presented first since they highlight many of our findings. These results are shown in FIG. 7, where the average wall clock time per Allreduce (in μsec) is plotted against the number of processors. Each plotted datum is the average of at least 3 runs, and each run is the result of thousands of Allreduce. Instead of the expected smooth, logarithmic scaling, the performance is linear and exhibits extreme variability. To investigate the cause of this poor performance, times for individual Allreduce were extracted from the AIX trace logs (without any kernel modifications or co-scheduler). A plot of 448 sorted Allreduce times, sampled from one node in a 944-processor run, is shown in FIG. 8. Models of the benchmark predict an Allreduce should take approximately 350 μsec. The fastest Allreduce come to within about 10% of this, but the median time is another 25% higher, and the slowest 10% represent significant outliers.

The average Allreduce time for this sample is 2240 μsec, about 6 times slower than expected. The outliers are the main contributors to the poor average Allreduce time: the slowest one accounts for more than half the total time. In examining the traces to determine what caused the outliers, we found that an administrative cron job ran during the slowest Allreduce. This cron job is run every 15 minutes to check on the health of the system. Its various components—Perl scripts and a variety of utility commands—run at a higher priority than user processes and steal CPU resources. We observed that on multiple nodes, one CPU had over 600 msec of wall clock time consumed by these components, blocking a single MPI task per node from making progress.

This worst outlier was an extreme case, but system daemons and interrupt handlers in other outliers similarly blocked user tasks. A variety of AIX daemons, such as syncd, mmfsd, hatsd, hats_nim, inetd, LoadL_startd, mld, and hostmibd, which run at higher priority than user processes, and interrupt handlers such as caddpin and phxentdd, commandeered CPUs to carry out their tasks. In addition, the execution of these processes was often accompanied by page faults, increasing their run time and further impacting the Allreduce performance. Most of the outliers could be attributed to these interferences. But for the remainder, one other source of interference was observed. In these cases, the trace records showed auxiliary threads of the user processes sharing the CPUs with the main threads. The total run time of the auxiliary threads amounted to a significant fraction of the Allreduce time. For example, in the case of one Allreduce that took 6.7 msec, the auxiliary threads consumed 4.5 msec of run time spread over several nodes. These auxiliary threads were identified as the MPI timer threads. They are the "progress engine" in IBM's MPI implementation. The default behavior is that these threads run every 400 msec, and, apparently, even with that relatively long period, their influence was strong enough to disrupt the tightly synchronized Allreduce code. For non-outliers, only minor interference from daemons was observed. And for the fastest Allreduce, only events marking the beginning and end of the Allreduce in each task and some decrementer interrupts showed up in the traces.

For the 15 tasks per node runs, our results agree with what many users have found in running their applications on these systems: absolute performance is improved and there is much less variability using 15 tasks per node. In spite of the improved performance, the scaling is still linear rather than logarithmic. The traces show that daemons aren't a problem in the 15 tasks per node runs since they make use of the available CPU. The MPI timer threads, however, still cause some interference. Besides them, decrementer interrupts are the only other potential source of interference contained in the traces, although these don't totally explain the observed linear scaling.

Figure 9:
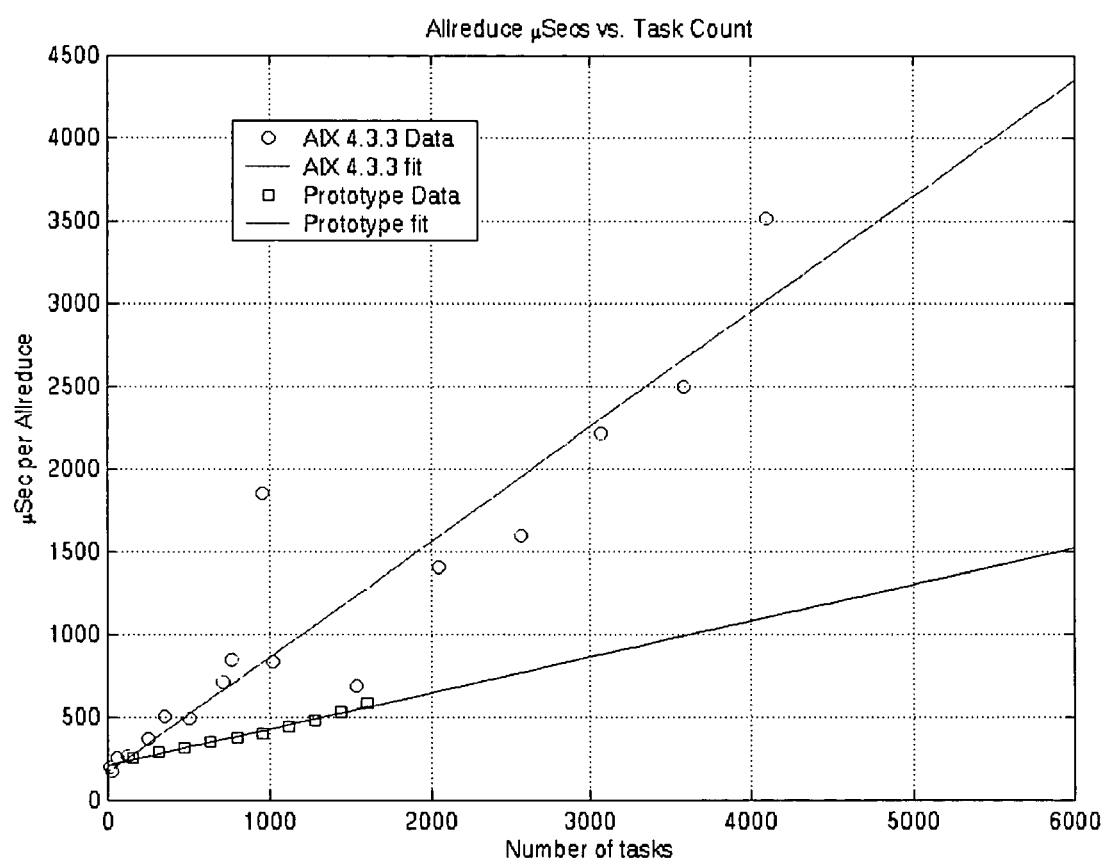
FIG. 9 is a graph plotting Allreduce usecs vs. Processor count using the co-sheduler and dispatcher of the present invention.

Results of 16 tasks per node runs of aggregate_trace using the kernel and co-scheduler of the present invention, and are shown in FIG. 9. The problems caused by the MPI timer threads was first addressed by increasing their period by a large amount and found this removed the interference. This is done by setting the environment variable MP_POLLING_INTERVAL to, say, 400,000,000 (period=400 seconds).

After establishing baselines, their effectiveness was tested via a series of benchmark runs. Co-scheduler parameter settings were chose, for example, with favored priority=30, unfavored priority=100, and a window of 5 seconds with 90% of the window at the favored priority; the kernel was set to use a big tick interval of 250 msec. Test runs were performed with these settings. As shown in FIG. 9, the Allreduce times have been cut by a factor of three and the performance no longer shows the extreme variability observed with the standard AIX kernel. In fact, 100 fully populated nodes running the prototype kernel yielded a 154% speedup over 100 nodes running at 15 tasks per node on the standard AIX kernel. This indicates that the delays caused by daemons have been dealt with effectively. As shown in FIG. 9, the upper points are from the 'vanilla' AIX 4.3.3 kernel, the lower points from the prototype kernel. Lines are fitted to the data: y_vanilla(x)=0.70(x)+166 y_prototype(x)=0.22(x)+210. The slope indicates ~3x improvement from these testshots.

Calculations were then performed using a parallel application to see if similar performance improvements would be seen with real applications. Since the kernel modifications and co-scheduler significantly change the scheduling behavior of AIX, tests using real applications were needed. Although the aggregate_trace benchmark replicates the fine-grain synchronization that is common in many of our production codes, it uses only a minimal subset of the MPI interface. Furthermore, other than occasional writes to standard output, the benchmark does no I/O. I/O is one of the key features a full service OS such as AIX provides, so we needed to make sure that the co-scheduling didn't adversely impact I/O. For this purpose, a LLNL application, known as ALE3D was utilized. Briefly, ALE3D was chose for performance analysis of the present invention because it is a large three-dimensional (3D) multi-physics code developed at LLNL having a wide variety of physics packages available therein, a large number of user-settable options, and a variety of meshes that the code can run simulations on. The test problem used initially for this study was an explicit time integrated hydrodynamics ALE calculation on a simple cylindrical geometry with slide surfaces. A shock generated by detonation of high explosive provided hydrodynamic motion over a timescale of tens of microseconds. The problem ran for approximately 50 timesteps, and each timestep involved a large amount of point-to-point MPI message passing, as well as several global reduction operations. The problem performed a fair amount of I/O by reading an initial state file at the beginning of the run, and dumping a restart file at the calculation's terminus.

Adjusting the favored priority to just above that of key I/O daemons, the I/O daemons are allowed to pre-empt the user tasks, thus providing a source of interference. For real applications, however, this is a good tradeoff. Note that the favored priority is still high enough to eliminate interference from other daemons. With these relative priorities, the ALE3D run time dropped 24% from 1315 seconds to 1152 seconds on 944 (59×16) processors using the prototype kernel and co-scheduler rather than the standard AIX kernel. Traces were performed of subsets of both runs. Examining the traces for the ALE3D run on the standard kernel, has shown some long running daemons that took up CPU resources during allreduce calls. This forced two MPI tasks to share a single CPU, delaying the allreduce. These daemons ran with a priority of 56, which is more favored than those for normal user processes, which range between 90 and 120. These daemons, and the consequent performance degradation they caused, were not observed in the traces of the run using the prototype kernel and co-scheduler since the priority of the user tasks had been boosted to 40. The elimination of this kind of interference, was, of course, what the co-scheduler was designed to do, and in our ALE3D runs, it was successful.

In conclusion, modifying the operating system to be specifically aware of, and provide coordinated scheduling of, fine-grain parallel processes leads to faster and more repeatable run times. This is further enhanced by providing a co-scheduler that synchronizes times across a cluster and provides preferred dispatch slots for large fine-grain parallel applications, while still allowing critical system daemons to perform their functions. The present system and methodology provides a run-time system and accompanying kernel modifications that increase the overlap of interfering system activities. Both long-lived system activities such as daemon schedulings and short-lived events such as timer-decrement interrupt processing are overlapped when using the prototype kernel and co-scheduler. The forced overlap of system interference is accomplished both intra-node and inter-node. Our results indicate a speedup of over 300% on synchronizing collectives. These fine-grain parallel operations have been shown to consume more than 50% of total time for typical bulk-synchronous SPMD applications at 1728 processors, and a larger percentage at higher processor counts.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. In a parallel computing environment comprising a network of SMP nodes each having at least one processor, a parallel-aware co-scheduling method for improving the performance and scalability of a dedicated parallel job having synchronizing collective operations, comprising:

coordinating interfering system overhead activities on a node and across nodes to promote intra-node and inter-node overlap of said interfering system overhead activities as well as intra-node and inter-node overlap of said synchronizing collective operations, said coordinating step including obtaining and using a globally synchronized time to schedule timer decrement interrupts at the same time across all processors and across all nodes and determine "compute time slots" and time slots for said interfering "system overhead" activities which are respectively synchronized across all processors and across all nodes, and changing the dispatching priority of tasks in each node at the beginning and end of said time slots; and generating timer decrement interrupts, which are a type of interfering system overhead activity, based on a big tick constant greater than 1 as a counter in the kernel where tick processing is involved, for increasing the interval between timer decrement interrupts and thereby reducing the total amount of system overhead cycles.

2. The method of claim 1, wherein the interfering system overhead activities are coordinated by binding tasks to particular processors, to ensure the best possible cache reuse.

3. The method of claim 1, wherein the interfering system overhead activities are coordinated by registering the tasks of a parallel job when they begin running so as to enable the identification of which tasks are to be controlled.

4. The method of claim 1,
wherein the step of changing the dispatching priority of tasks is by cycling the process priority of the tasks between a favored and unfavored value at periodic intervals.

5. The method of claim 1,
wherein the system overhead tasks are executed with maximum parallelism by permitting only the parallel job's threads to be queued to specific processors while forcing all system overhead tasks to be queued to all processors, so as to minimize the total running time of said system overhead tasks.

6. The method of claim 1,
wherein the amount of system overhead cycles are reduced by running system daemons less frequently.

7. The method of claim 6,
wherein system daemons are run less frequently by providing a co-scheduler that substantially simultaneously sets the relative priorities of the daemons and the parallel job, so as to delay daemon operation for the batch execution of daemon operations.

8. In a parallel computing environment comprising a network of SMP nodes each having at least one processor, a dedicated job co-scheduling system for improving the scalability of parallel application having synchronous collective operations, comprising:
an external time-based, dedicated job co-scheduler module running on each node and adapted to periodically read a globally synchronized clock to obtain a globally synchronized time from which to determine "compute time slots" and time slots for "system overhead" activities which are the same on each processor and node of the parallel computing environment, and
a kernel scheduling dispatcher module for dispatching tasks based on priority and adapted to cause timer decrement interrupts at a same time based on the globally synchronized time so that all of said time slots start and end at the same time across all processors and across all nodes, said kernel scheduling dispatcher module adapted to change a timer decrement interval to a preferred interval period based on a big tick constant greater than 1 for reducing the total amount of system overhead cycles,
wherein the co-scheduler is adapted to change the dispatching priority of the tasks under its control at the beginning and end of said time slots so that the dispatcher module generates a corresponding processor interrupt based on said change, so as to improve the performance and scalability of the parallel application.

9. The dedicated job co-scheduling system of claim 8,
wherein the global synchronized clock is a switch register.

10. The dedicated job co-scheduling system of claim 8,
wherein the co-scheduler is adapted to register tasks of a parallel job when said tasks begin running, so as to enable the co-scheduler to identify which tasks are to be controlled.

11. The dedicated job co-scheduling system of claim 8,
wherein the co-scheduler is adapted to bind tasks to particular processors, to ensure the best possible cache reuse.

12. The dedicated job co-scheduling system of claim 8,
wherein the kernel scheduling dispatcher module is adapted to selectively use the local run queue only for parallel tasks identified by a predetermined environment variable, and move all others to the global run queue.

13. The dedicated job co-scheduling system of claim 8,
wherein the kernel scheduling dispatcher module is adapted to receive a preferred setting of the timer interval.

* * * * *